(12) United States Patent
George

(10) Patent No.: US 8,414,994 B2
(45) Date of Patent: Apr. 9, 2013

(54) MACHINE APPLICABLE NOTE-CARRIED LIQUID PACK

(75) Inventor: John W. George, St. Joseph, MO (US)

(73) Assignee: Express Card and Label Co., Inc., Topeka, KS (US)

( * ) Notice: Subject to any disclaimer, the term of this patent is extended or adjusted under 35 U.S.C. 154(b) by 215 days.

(21) Appl. No.: 13/078,756

(22) Filed: Apr. 1, 2011

(65) Prior Publication Data

US 2011/0244151 A1 Oct. 6, 2011

Related U.S. Application Data

(60) Provisional application No. 61/320,092, filed on Apr. 1, 2010.

(51) Int. Cl.
*B32B 33/00* (2006.01)
*B32B 1/04* (2006.01)
*B32B 3/02* (2006.01)
*B32B 7/12* (2006.01)

(52) U.S. Cl.
USPC .......... 428/40.1; 428/34.1; 428/42.1; 428/57; 428/58; 428/343; 428/354; 206/460; 206/461; 206/484

(58) Field of Classification Search .................. 428/34.1, 428/35.2, 35.4, 35.7, 36.6, 36.7, 40.1, 41.7, 428/42.1–47, 57, 58, 68, 75, 77–79, 98, 102–104, 428/343, 354, 905; 206/460, 461, 484
See application file for complete search history.

(56) References Cited

U.S. PATENT DOCUMENTS

| | | | |
|---|---|---|---|
| 5,249,827 A | 10/1993 | Olson | |
| 5,391,420 A * | 2/1995 | Bootman et al. | 206/213.1 |
| 5,566,693 A | 10/1996 | Gunderman | |
| 5,879,769 A * | 3/1999 | Greenland et al. | 428/35.7 |
| 6,326,069 B1 | 12/2001 | Barnett | |
| 6,691,872 B1 * | 2/2004 | Berman et al. | 206/484 |
| 7,213,770 B2 * | 5/2007 | Martens et al. | 239/57 |
| 7,824,752 B2 | 11/2010 | George | |

FOREIGN PATENT DOCUMENTS

EP 0525530 A2 3/1993

OTHER PUBLICATIONS

PCT Search Report and Written Opinion from PCT Application No. PCT/US2011/030988 entitled Machine Applicable Note-Carried Liquid Pack (Dated Nov. 30, 2011).

* cited by examiner

*Primary Examiner* — Patricia Nordmeyer
(74) *Attorney, Agent, or Firm* — Hovey Williams LLP

(57) ABSTRACT

A note-carried liquid pack for application on an article by machine includes a base note layer with printed indicia on a top note face. The note-carried liquid pack also includes first and second fluid-impermeable, substantially transparent laminate layers overlying the base note layer. A first adhesive secures the first laminate layer to the base note layer, and a second adhesive secures the second laminate layer to the first laminate layer along an endless adhesive boundary. The endless adhesive boundary surrounds a central portion devoid of adhesive, in which the laminate layers define a liquid-holding pocket therebetween. A substantially transparent liquid is disposed within the pocket to be sealed therein so long as at least portions of the laminate layers adjacent the pocket remain secured to one another. The printed indicia is viewable through the laminate layers and through the pocket. A web label product including a plurality of note-carried liquid packs carried on an elongated liner is also disclosed.

25 Claims, 12 Drawing Sheets

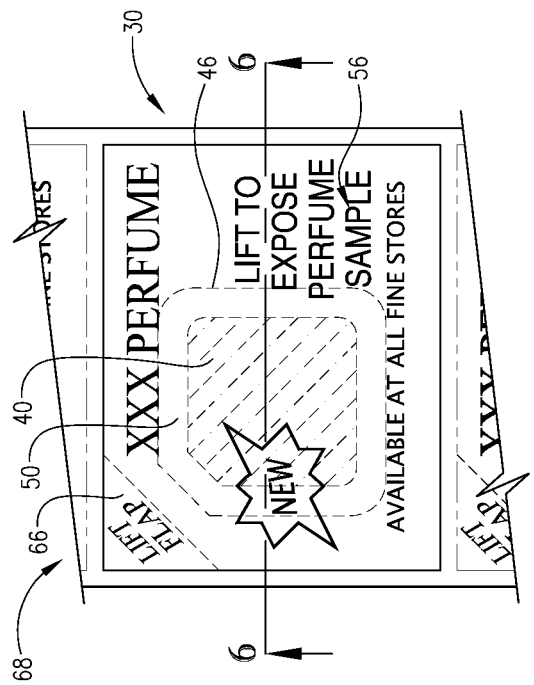
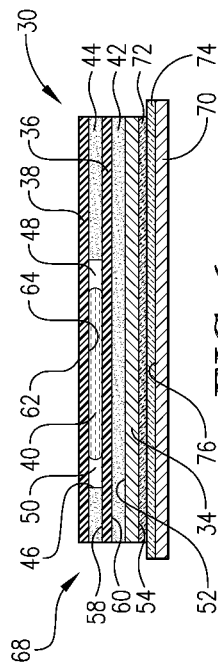
FIG. 5
FIG. 6
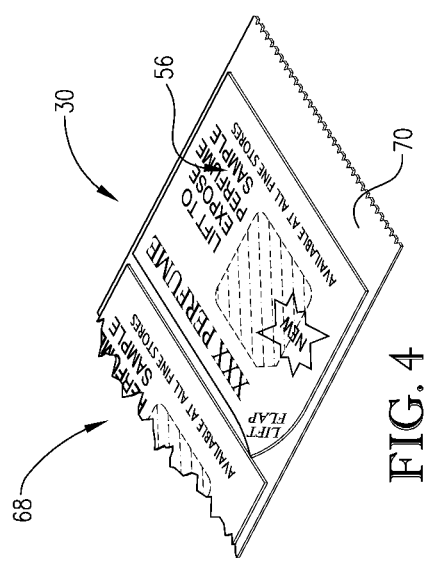
FIG. 4

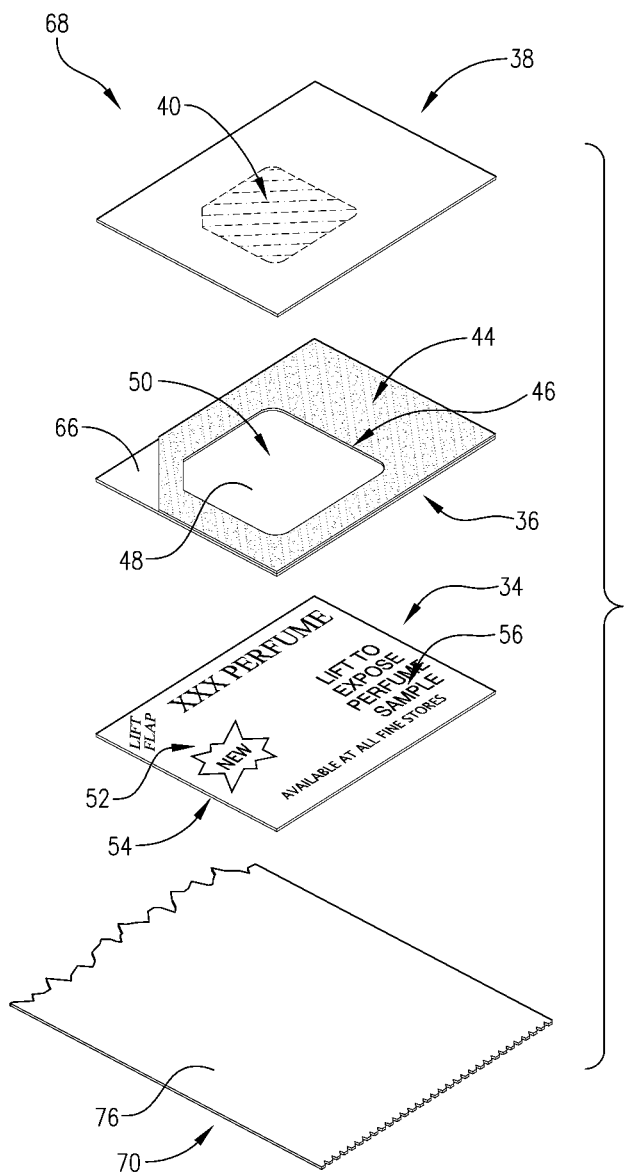

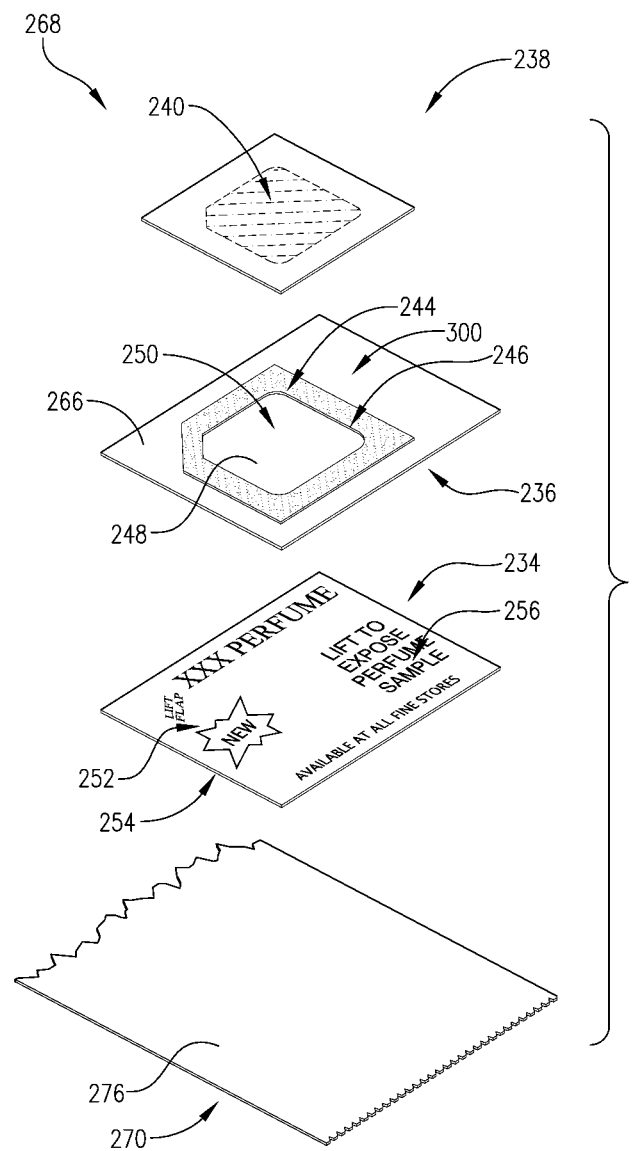

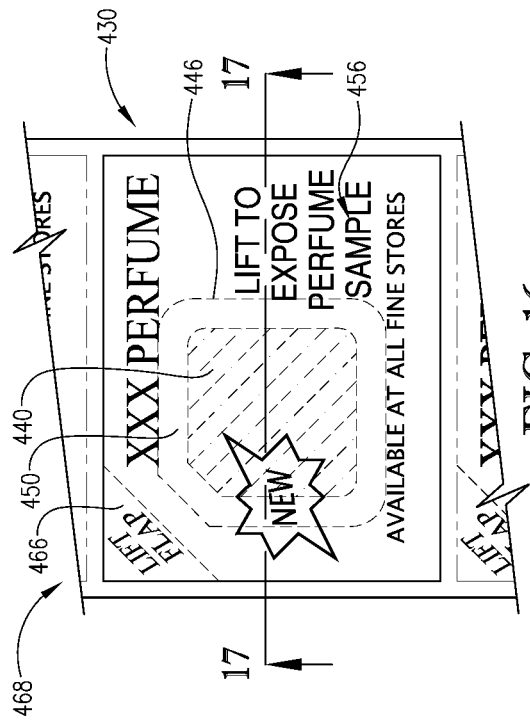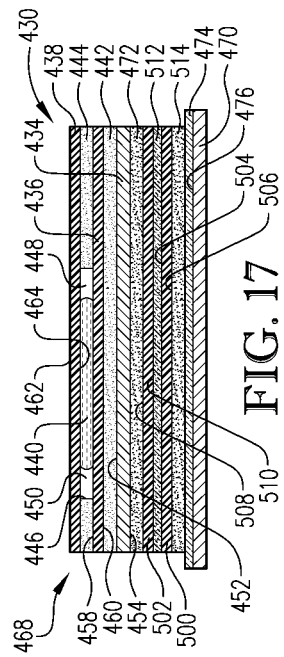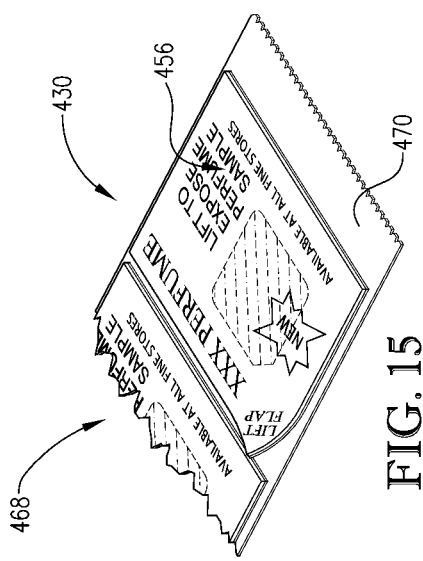

MACHINE APPLICABLE NOTE-CARRIED LIQUID PACK

CROSS-REFERENCE TO RELATED APPLICATION

The present application claims the benefit of and priority from U.S. Provisional Patent Application Ser. No. 61/320,092, filed Apr. 1, 2010, the entire disclosure of which is hereby incorporated by reference herein.

BACKGROUND OF THE INVENTION

1. Field of the Invention

The present invention relates generally to label and card products to be applied to an article, such as a newspaper, by a machine. More specifically, the present invention concerns a note-carried liquid pack that includes printed indicia on a note layer and a pair of laminate layers defining a substantially transparent liquid-holding pocket overlying the note layer, with a substantially transparent liquid disposed within the pocket.

2. Discussion of the Prior Art

Those of ordinary skill in the art will appreciate that many retail cosmetic products are scented (e.g., perfumes, lotions, deodorants, etc.), and that it may be advantageous to provide potential customers with a sample of the scent in the advertisement of these products. Many cosmetic products are advertised and/or sold through catalogs or other print media, and it is generally known to be desirable to attempt to provide an adequate scent sample along with the advertising or ordering information.

Traditional products for providing a scent sample have been satisfactory in some respects, but have also presented numerous drawbacks. For example, scratch-and-sniff products often used to help sell perfumes may provide a sample of the perfume scent and can be relatively inexpensive. However, the strength of the scent used in conventional scratch-and-sniff products tends to be very weak and there is no true "tester" product to be applied to the skin for real evaluation.

More recently, plastic pouches including a sample of perfume or lotion inside the pouch have come to market. While known pouches may include a more realistic scent sample than scratch-and-sniff products, the distribution of these pouches has presented numerous disadvantages. When placed in catalogs, known pouches have been attached to advertising pages with a permanent adhesive, preventing removal of the pouch from the catalog.

Moreover, known pouches that are attached on top of, or next to, existing advertising copy require careful, manual application (a costly and time-consuming process) in order to line up properly. Finally, known liquid pouches have included a powder or other generally opaque substance disposed within the pouch to aid in maintaining placement of the liquid sample during manufacture of the pouch, often detrimentally impacting the visual appeal of the finished pouch, particularly in cosmetic applications.

SUMMARY

According to an aspect of the present invention, a note-carried liquid pack is provided that may be applied to an article (such as a newspaper, magazine, or catalog) in a variety of advantageous embodiments. A plurality of the note-carried liquid packs can be applied by machine at very high speeds (upwards of twenty-five per second). The pack broadly includes a base note layer with printed indicia thereon, and a liquid-holding pocket defined between first and second fluid-impermeable, substantially transparent laminate layers overlying the base note layer, with a substantially transparent liquid sample disposed within the pocket.

The note-carried liquid pack is easily removable from the article, allowing a user to take a pack from a catalog or magazine to share with another or for reference when shopping in a store. The inventive pack can include advertising or other information about a product associated with the liquid sample on the base note layer, ensuring that a removed pack still provides helpful information relating to the liquid sample inside. The glossy sheen of at least one of the substantially transparent laminate layers overlying the base note layer provides an aesthetically pleasing presentation, especially for cosmetic advertising.

More particularly, according to one aspect of the present invention, a note-carried liquid pack configured to be applied to an article by a machine includes a base note layer presenting opposite top and bottom note faces. The base note layer has printed indicia on the top note face. The note-carried liquid pack also includes a first fluid-impermeable, substantially transparent laminate layer overlying at least a portion of the top face of the base note layer and presenting opposite top and bottom first laminate faces. A first adhesive is disposed between the base note layer and the first laminate layer and operably secures the respective layers to one another. The note-carried liquid pack further includes a second fluid-impermeable, substantially transparent laminate layer overlying at least a portion of the top face of the first laminate layer and presenting opposite top and bottom second laminate faces. A second adhesive is disposed between the first laminate layer and the second laminate layer to adhere the laminate layers to one another along an endless adhesive boundary surrounding a central portion devoid of adhesive. In the central portion that is devoid of adhesive, the laminate layers define a liquid-holding pocket between the respective top and bottom faces thereof. The note-carried liquid pack also includes a substantially transparent liquid disposed within the liquid-holding pocket. The liquid is sealed in the pocket so long as at least portions of the first and second laminate layers adjacent the pocket remain secured to one another by the second adhesive.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

Figure 1:
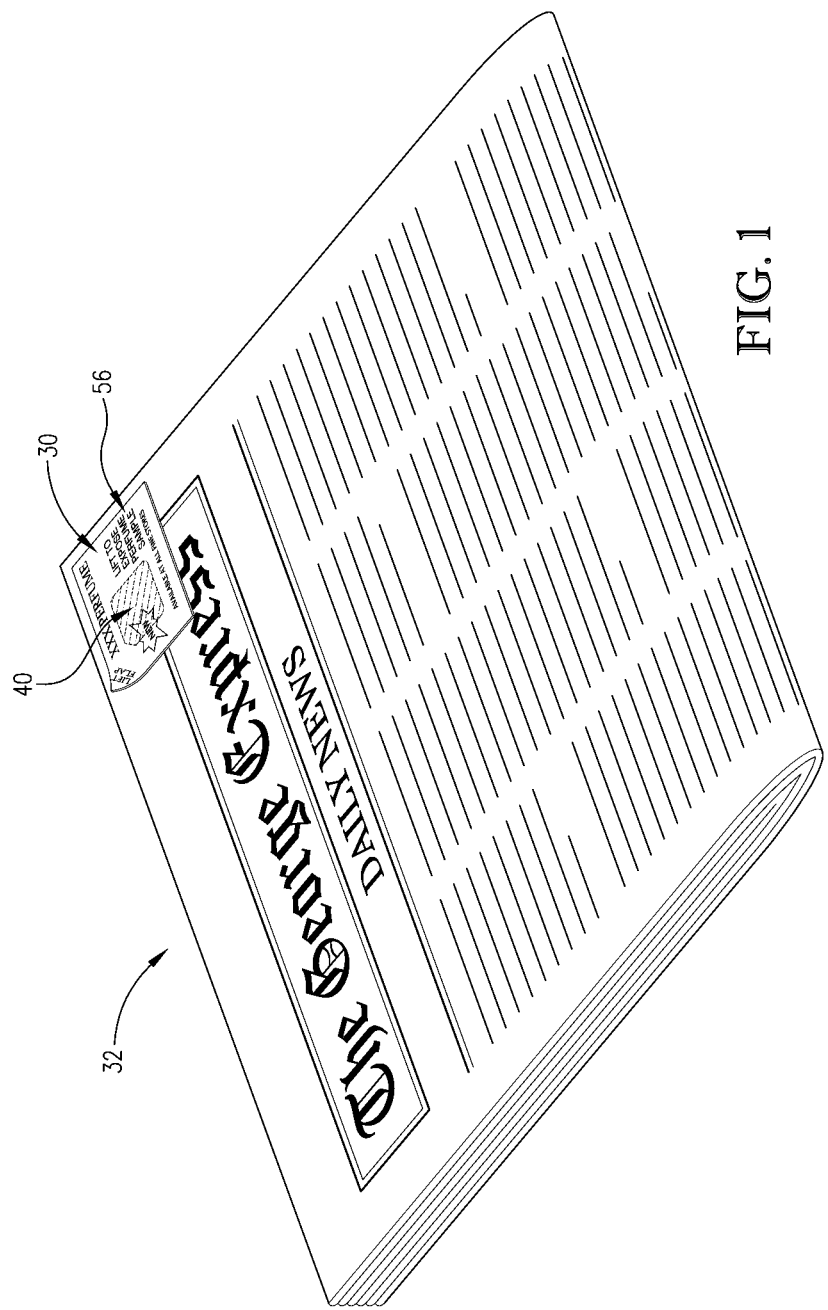
FIG. 1 is an isometric view of a newspaper article including a note-carried liquid pack constructed in accordance with the principles of a preferred embodiment of the present invention applied thereto.
Figure 2:
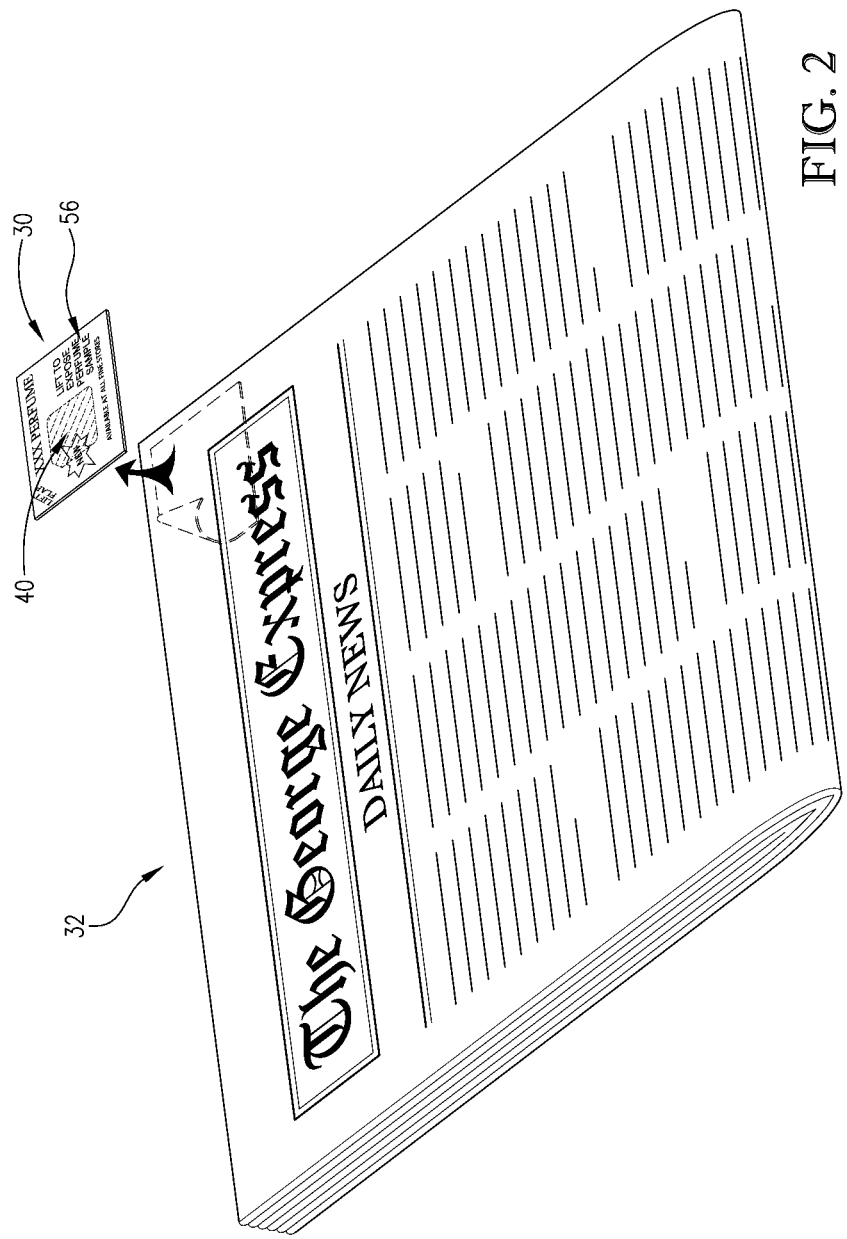
FIG. 2 is an isometric view of the newspaper article and the note-carried liquid pack of FIG. 1, depicting the note-carried liquid pack being cleanly removed from the newspaper article.
Figure 3:
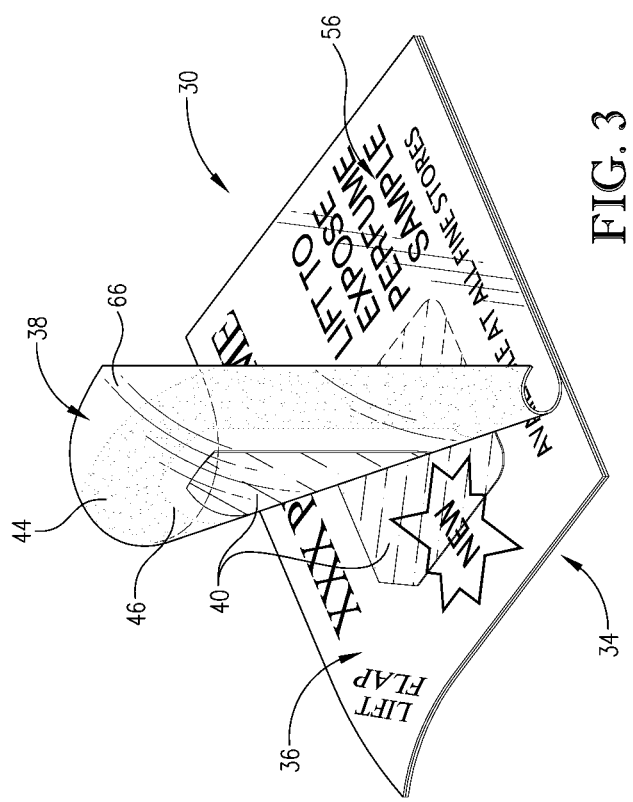
Figure 8:
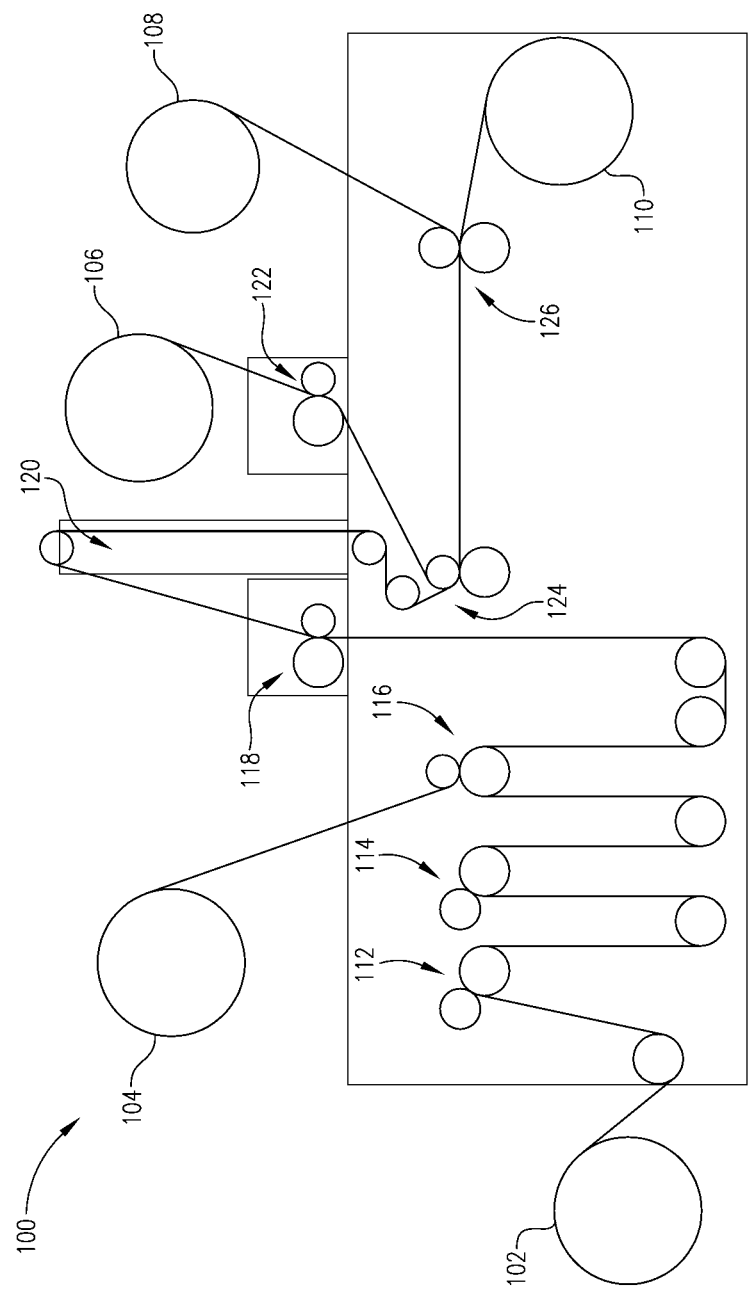
Figure 9:
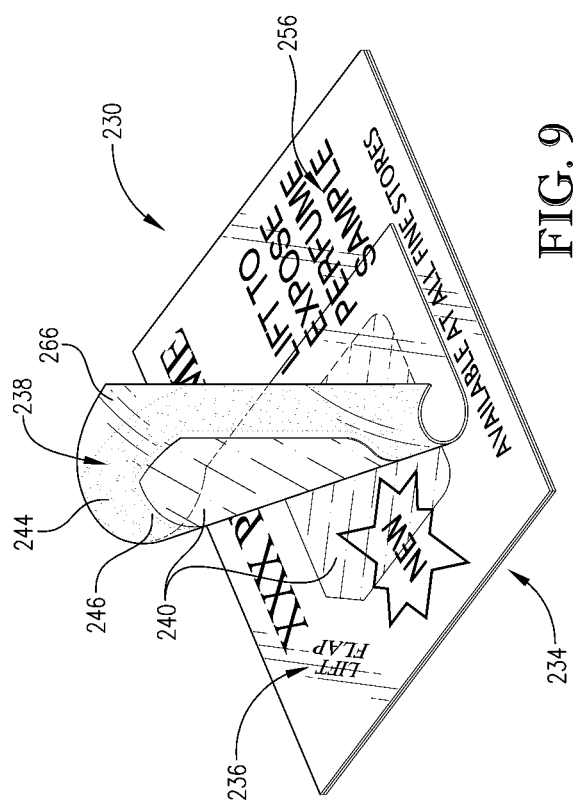
Figure 11:
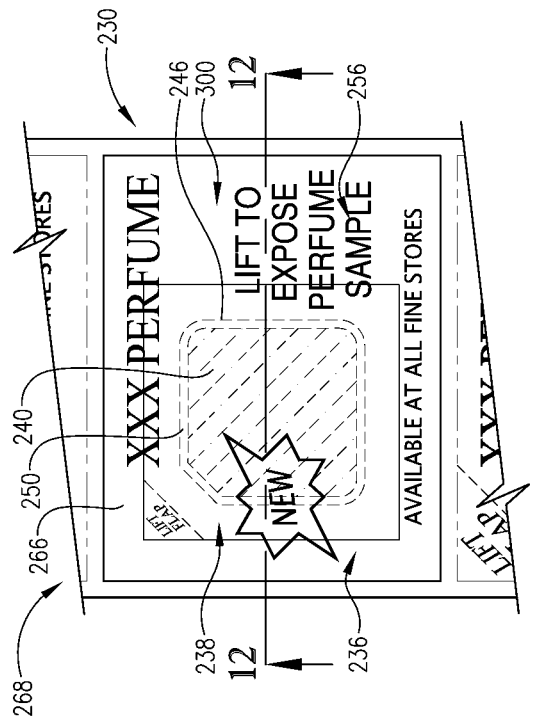
Figure 12:
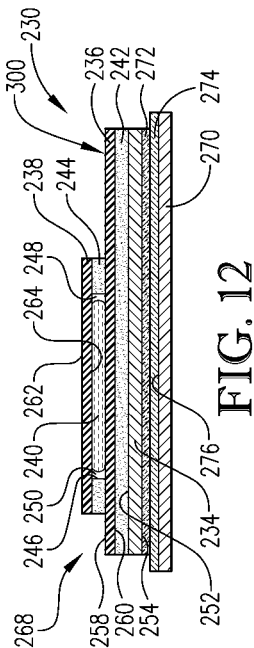
Figure 10:
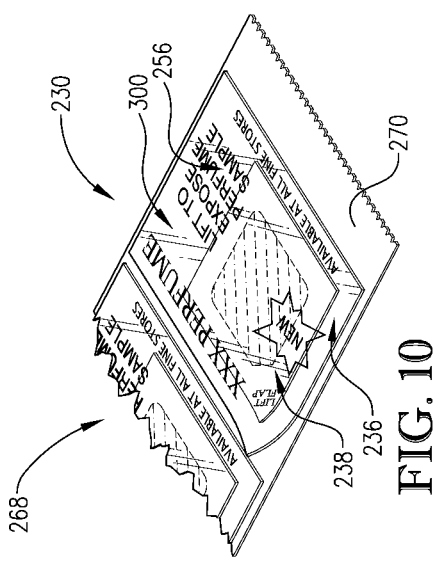
Figure 14:
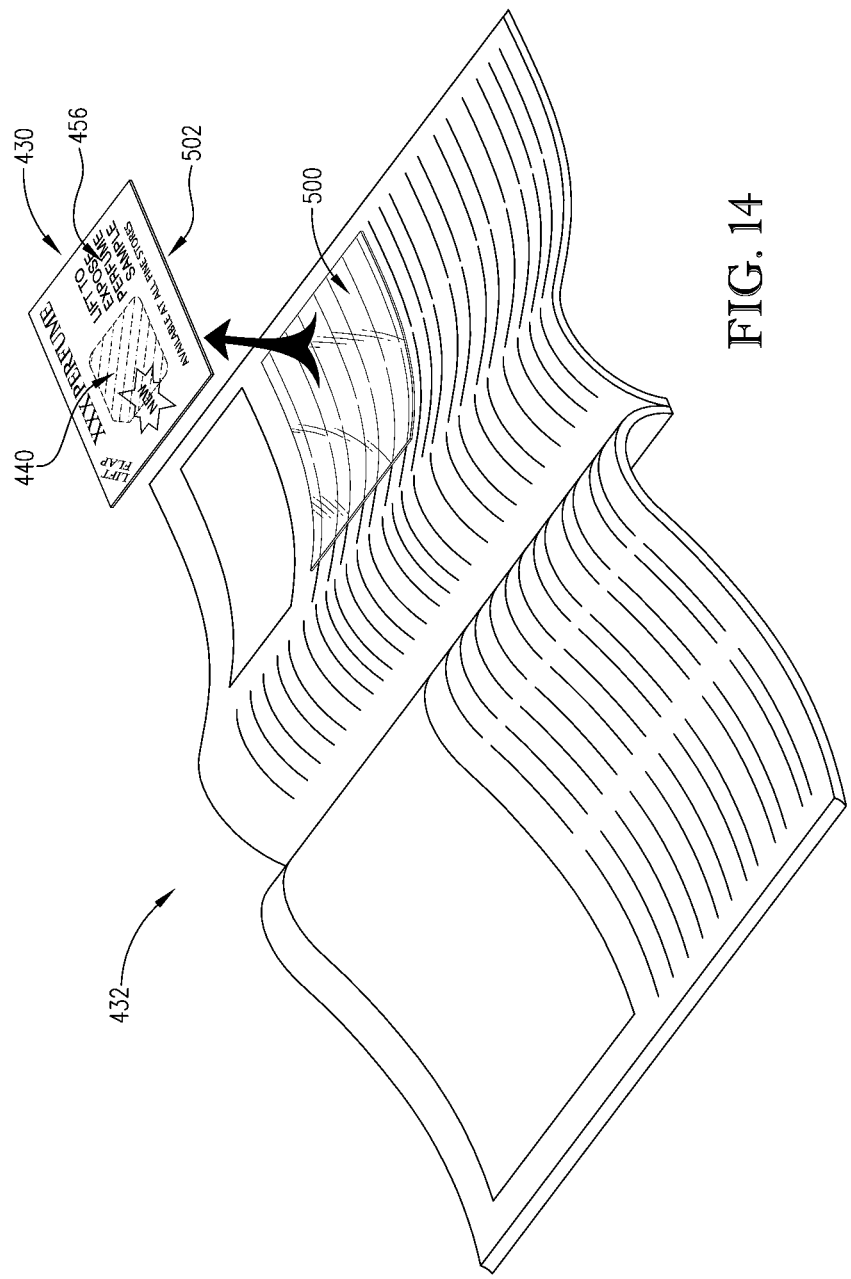
Figure 18:
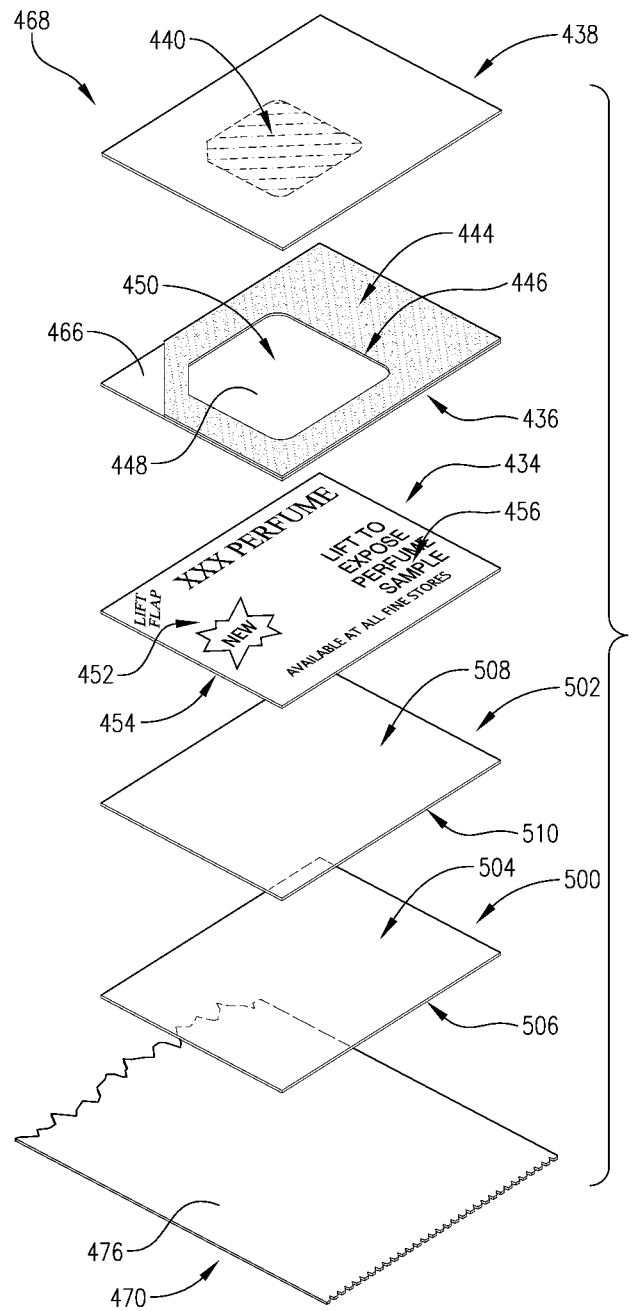

FIG. 3 is an enlarged, isometric view of the note-carried liquid pack of FIGS. 1-2, depicting details of construction and operation of the pack, particularly illustrating a printed base note layer, first and second laminate layers overlying the base note layer, and the second laminate layer being partially separated from the first laminate layer to reveal a liquid disposed within a pocket defined between the laminate layers;

FIG. 4 is a fragmentary, isometric view of a web label product including a plurality of the note-carried liquid packs of FIGS. 1-3 disposed on a common liner, with a corner of one of the packs illustrated as being slightly lifted from the liner;

FIG. 5 is an enlarged, fragmentary, top-down plan view of the web label product including a plurality of the note-carried liquid packs of FIGS. 1-3 disposed on a common liner;

FIG. 6 is an enlarged, fragmentary, side-sectional view of the web label product of FIG. 5, taken along the line 6-6 thereof, depicting details of construction of one of the packs disposed on the liner, including the printed base note layer, the first and second laminated layers, the liquid disposed within the pocket, and the adhesive coatings;

FIG. 7 is an exploded, generally isometric view of the web label product of FIG. 4, depicting details of construction of the layers and associated adhesive coatings of one of the packs disposed on the liner;

FIG. 8 is a generally schematic view of a web press suitable for manufacturing the web label product of FIG. 4 or 5;

FIG. 9 is an enlarged, isometric view of a note-carried liquid pack constructed in accordance with the principles of another preferred embodiment of the present invention, similar in many respects to the liquid pack of FIG. 3, depicting details of construction and operation of the pack, particularly illustrating a printed base note layer, first and second laminate layers overlying the base note layer, and the smaller second laminate layer being partially separated from the first laminate layer to reveal a liquid disposed within a pocket defined between the laminate layers;

FIG. 10 is a fragmentary, isometric view of a web label product including a plurality of the note-carried liquid packs of FIG. 9 disposed on a common liner, similar in many respects to the view of FIG. 4, with a corner of one of the packs illustrated as being slightly lifted from the liner;

FIG. 11 is an enlarged, fragmentary, top-down plan view of the web label product including a plurality of the note-carried liquid packs of FIG. 9 disposed on a common liner, similar in many respects to the view of FIG. 5;

FIG. 12 is an enlarged, fragmentary, side-sectional view of the web label product of FIG. 11, taken along the line 12-12 thereof, similar in many respects to the view of FIG. 6, depicting details of construction of one of the packs disposed on the liner, including the printed base note layer, the first and second laminated layers, the liquid disposed within the pocket, and the adhesive coatings;

FIG. 13 is an exploded, generally isometric view of the web label product of FIG. 10, similar in many respects to the view of FIG. 7, depicting details of construction of the layers and associated adhesive coatings of one of the packs disposed on the liner;

FIG. 14 is an isometric view of a magazine article including a note-carried liquid pack constructed in accordance with the principles of another preferred embodiment of the present invention applied thereto, depicting all but one layer the note-carried liquid pack being cleanly removed from the magazine article;

FIG. 15 is a fragmentary, isometric view of a web label product including a plurality of the note-carried liquid packs of FIG. 14 disposed on a common liner, similar in many respects to the view of FIG. 4, with a corner of one of the packs illustrated as being slightly lifted from the liner;

FIG. 16 is an enlarged, fragmentary, top-down plan view of the web label product including a plurality of the note-carried liquid packs of FIG. 14 disposed on a common liner, similar in many respects to the view of FIG. 5;

FIG. 17 is an enlarged, fragmentary, side-sectional view of the web label product of FIG. 16, taken along the line 17-17 thereof, similar in many respects to the view of FIG. 6, depicting details of construction of one of the packs disposed on the liner, including the printed base note layer, the first and second laminated layers, the liquid disposed within the pocket, first and second clear film layers, and the adhesive coatings; and FIG. 18 is an exploded, generally isometric view of the web label product of FIG. 15, similar in many respects to the view of FIG. 7, depicting details of construction of the layers and associated adhesive coatings of one of the packs disposed on the liner;

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

With initial reference to FIGS. 1-2, a note-carried liquid pack 30 constructed in accordance with the principles of an embodiment of the present invention is shown with an article in the form of a newspaper 32. As will be readily appreciated, FIG. 1 shows the liquid pack 30 secured to an upper right corner of the newspaper 32, while FIG. 2 shows the liquid pack 30 being cleanly removed from the newspaper 32.

It will of course be understood that the newspaper 32 is depicted by way of example only, and that the liquid pack 30 of the present invention could also be secured to any other suitable article (e.g., a magazine, a catalog, etc.) without departing in the slightest from the teachings of the present invention. In more detail with respect to FIG. 2, the liquid pack 30 is quickly and easily removable from the newspaper 32 (or other article; not shown) without causing any damage to the underlying article or leaving any adhesive residue thereon.

With reference now to FIGS. 3-7, the liquid pack 30 broadly includes a printed base note layer 34, a first fluid-impermeable laminate layer 36 generally overlying at least a portion of the base note layer 34, a second fluid-impermeable laminate layer 38 generally overlying at least a portion of the first laminate layer 36, and a liquid 40 disposed generally between the first and second laminate layers 36, 38.

In more detail, and with reference particularly to FIG. 6, the liquid pack 30 also includes a first adhesive 42 disposed between the base note layer 34 and the first laminate layer 36. The first adhesive 42 operably secures the base note layer 34 and the first laminate layer 36 to one another. The liquid pack 30 further includes a second adhesive 44 disposed between the first laminate layer 36 and the second laminate layer 38.

The second adhesive 44 operably secures portions of the first laminate layer 36 and the second laminate layer 38 to one another.

In even more detail, and with attention specifically on FIGS. 5 and 6, the second adhesive 44 adheres the first and second laminate layers 36, 38 to one another along an endless adhesive boundary 46. The adhesive boundary 46 surrounds a central portion 48 that is devoid of the second adhesive 44. Within the central portion 48, surrounded by the adhesive boundary 46, the first and second laminate layers 36, 38 cooperatively define therebetween a liquid-holding pocket 50.

Returning now to FIG. 6, and as will be readily appreciated by one of ordinary skill in the art upon a detailed review of FIG. 3, the liquid 40 is disposed within the liquid-holding pocket 50. Furthermore, the liquid 40 is sealed within the liquid-holding pocket 50 so long as at least portions of the first and second laminate layers 36, 38 adjacent the pocket 50 (e.g., the adhesive boundary 46) remain secured to one another by the second adhesive 44.

With attention still on FIGS. 3 and 6, the base note layer 34 will be described in further detail. The base note layer 34 presents opposite top and bottom note faces 52, 54. The base note layer 34 includes printed indicia 56 on the top note face 52. In the depicted embodiment, the printed indicia 56 includes information about a retail perfume product.

In more detail, the printed indicia 56 of the embodiment depicted herein collectively includes words of product identification ("XXX PERFUME"), words of product description (including the phrase "AVAILABLE AT ALL FINE STORES," and the word "NEW" within the burst graphic), words of general instruction regarding use of the liquid pack 30 ("LIFT TO EXPOSE PERFUME SAMPLE"), and words identifying how and where to access the liquid-holding pocket 50 ("LIFT FLAP"). As will be readily appreciated by one of ordinary skill in the art, the printed indicia 56 may additionally or alternatively include other printed information (e.g., colors, graphics, photographs, indexing indicia, etc.) without departing from the teachings of the present invention. It will also be readily understood that additional printed indicia (not shown) may be included on the bottom note face 54.

The base note layer 34 is preferably, although not necessarily, formed of paper. As will be readily appreciated by one of ordinary skill in the art upon review of this disclosure, the base note layer 34 may be alternatively formed from any suitable printable stock without departing from the teachings of the present invention. It will also be readily understood that the illustrated base note layer 34 (and actually the entire liquid pack 30) presents a generally rectangular shape, although an alternative base note layer (and/or an alternative liquid pack) may take other shapes while remaining firmly within the ambit of the present invention.

With continued attention to FIGS. 3 and 6, the first laminate layer 36 will be described in further detail. The first laminate layer 36 presents opposite top and bottom first laminate faces 58, 60. The first laminate layer 36 is fluid-impermeable, at least substantially transparent, and overlies at least a portion of the top face 52 of the base note layer 34.

Preferably, although not necessarily, the first laminate layer 36 substantially entirely overlies the printed indicia 56 on the top face 52 of the base note layer 34. In the depicted embodiment, the first laminate layer 36 and the base note layer 34 are sized to be co-extensive with one another, such that the first laminate layer 36 completely overlies the entire base note layer 34. It will be readily appreciated by one of ordinary skill in the art, however, that the first laminate layer 36 need not overlie the entire base note layer 34, but instead may be sized smaller than the base note layer 34 to overlie only a portion thereof without departing from the teachings of the present invention.

The first laminate layer 36 is preferably at least substantially transparent. Even more preferably, the first laminate layer 36 as depicted herein is entirely clear. In other words, when viewing the printed indicia 56 on the top face 52 of the base note layer 34 through the overlying first laminate layer 36, the laminate layer 36 neither distorts nor appreciably changes the color of the printed indicia 56 therebelow. The first laminate layer 36 is preferably, although not necessarily, formed of polypropylene, although one of ordinary skill in the art will readily appreciate that other suitable materials (e.g., other thin plastic sheets) are available.

With attention still to FIGS. 3 and 6, the second laminate layer 38 will be described in further detail. The second laminate layer 38 presents opposite top and bottom second laminate faces 62, 64. The second laminate layer 38 is fluid impermeable, at least substantially transparent, and overlies at least a portion of the top face 58 of the first laminate layer 36.

In the embodiment depicted in FIGS. 1-7, the second laminate layer 38 and the first laminate layer 36 are sized to be co-extensive with one another, such that the second laminate layer 38 completely overlies the entire first laminate layer 36. It will be readily appreciated by one of ordinary skill in the art, however, that the second laminate layer 38 need not overlie the entire first laminate layer 36, but may instead be sized smaller than (or even shaped differently from) the first laminate layer 36 to overlie only a portion thereof without departing from the teachings of the present invention.

The second laminate layer 38 is preferably at least substantially transparent. Even more preferably, the second laminate layer 38 as depicted herein is entirely clear. In other words, when viewing the printed indicia 56 on the top face 52 of the base note layer 34 through the overlying first and second laminate layers 36, 38, neither of the laminate layers 36, 38 distorts nor appreciably changes the color of the printed indicia 56 therebelow. More specifically, when at least some of the printed indicia 56 underlies the liquid-holding pocket 50, shown in the depicted embodiment described herein, the printed indicia 56 is clearly viewable to a user through both of the laminate layers 36, 38, including through portions thereof defining the liquid-holding pocket 50. The second laminate layer 38 is preferably, although not necessarily, formed of polyester, although one of ordinary skill in the art will readily appreciate that other suitable materials (e.g., other thin plastic sheets) are available.

The liquid 40 disposed within the liquid-holding pocket 50 will now be described in further detail. It is initially noted that the term "liquid," as used herein, is broadly defined as and is intended to mean a flowable substance that at least includes a liquid component. The term "liquid," as used herein specifically includes classic fluids, semi-fluids, semi-solids mixed with liquids, gels (both physical and chemical), suspensions, and the like, so long as the substance is flowable and includes a liquid component.

The liquid 40 is preferably at least substantially transparent. Even more preferably, the liquid 40 as depicted herein is entirely clear. In other words, when viewing the printed indicia 56 on the top face 62 of the base note layer 34 through the liquid-holding pocket 50, neither the laminate layers 36, 38, nor the liquid 40, distorts nor appreciably changes the color of the printed indicia 56 therebelow. More specifically, when at least some of the printed indicia 56 underlies the liquid-holding pocket 50, shown in the depicted embodiment described herein, the printed indicia 56 is clearly viewable to a user through both of the laminate layers 36, 38, including through portions thereof defining the liquid-holding pocket 50, and through the liquid 40 itself. Preferably, the liquid 40 and the liquid-holding pocket 50 are both clear and devoid of any opaque particulate therein.

In a preferred embodiment, the liquid 40 comprises a scented liquid. Most preferably, when the printed indicia 56 includes information that communicates a message about a retail product (such as a retail perfume product shown in the depicted embodiment described herein), the liquid 40 corresponds with the message of the printed indicia 56. In other words, the liquid 40 is preferably, although not necessarily, a sample of scented liquid associated with the product described by the printed indicia 56 (such as a perfume, or a scent sample associated with a deodorant or the like), as will be readily appreciated by one of ordinary skill in the art upon review of this disclosure.

In the preferred embodiment depicted and described herein, the liquid 40 further comprises a viscosity-enhancing material. Thus, the liquid 40 disposed within the liquid-holding pocket 50 is a mixture of a scented liquid and a viscosity-enhancing material. As one of ordinary skill in the art will readily appreciate, many cosmetics (such as perfumes) have a very low viscosity, and their "runny" nature can make assembly of the pack 30 problematic. It is also necessary for the liquid 40 to be flowable enough to be applied between the first and second laminate layers 36, 38 using suitable techniques (such as printing). It has been determined that the liquid 40 preferably has a viscosity of from about 100 to about 2000 centistokes, more preferably about 800 to about 1200 centistokes, and most preferably about 1000 centistokes at room temperature when forming the liquid pack 30. In a preferred embodiment, one suitable viscosity-enhancing material is available from Chemsil Silicones, Inc. of Chatsworth, Calif., under the product name COSMETIC FLUID 6040, which the manufacturer states has a viscosity of 1000 centistokes at 25° C. (77° F.).

Additional details regarding preferable first and second adhesives 42, 44 will now be described. In the depicted embodiment, the first adhesive 42 is preferably, although not necessarily, a permanent adhesive coating disposed on the bottom face 60 of the first laminate layer 36. In even more detail, the first laminate layer 36 and the first adhesive 42 are preferably provided as a self-wound roll (not shown). Also in the depicted embodiment, the second adhesive 44 is configured to permit separation of the first and second laminate layers 36, 38 along at least a portion of the adhesive boundary 46 to thereby expose the liquid 40 within the liquid-holding pocket 50.

In more detail, the second adhesive 44 preferably, although not necessarily, comprises a pressure-sensitive adhesive. In even more detail, the second adhesive 44 most preferably comprises a repositionable pressure-sensitive adhesive, such that the first and second laminate layers 36, 38 are operable to re-adhere to one another after separation thereof to expose the liquid 40 within the liquid-holding pocket 50. In this way, a first user may expose the liquid 40 and then conveniently and effectively re-seal the liquid-holding pocket 50 such that a second user may also expose the liquid 40 at a later time. In even greater detail, the preferred second adhesive 44 described herein is a water-based laminating adhesive, although other suitable adhesives (e.g., an ultra-violet curable adhesive) are contemplated and remain within the ambit of the invention. While an ultra-violet curable adhesive may contain an odor (and thus may not be desired when the liquid 40 is scented), an ultra-violet curable adhesive may nonetheless be suitable if another liquid is used.

With specific reference now to FIGS. 3 and 6 of the depicted embodiment, the first and second laminate layers 36, 38 cooperatively define therebetween a lift flap area 66 between the top face 58 of the first laminate layer 36 and the bottom face 64 of the second laminate layer 38. In more detail, the lift flap area 66 is defined by a second portion between the first and second laminate layers 36, 38 that is devoid of the second adhesive 44. In even more detail, the second laminate layer 38 is illustrated as presenting a generally rectangular lateral shape, with the lift flap area 66 being triangularly shaped and defined adjacent a corner of the rectangular second laminate layer 38. Of course, one of ordinary skill in the art will readily appreciate that alternative shapes and/or positions of the lift flap area may be incorporated without departing from the teachings of the present invention.

With particular attention now to FIGS. 4-7, a web label product 68 is depicted including a plurality of the note-carried liquid packs 30 described in detail above. More specifically, the web label product 68 comprises an elongated liner 70 and a plurality of the liquid packs 30. In more detail, the base note layer 34 of each of the liquid packs 30 includes a pressure-sensitive adhesive coating 72, preferably a repositionable adhesive, disposed on the bottom face 54 thereof. The repositionable pressure-sensitive adhesive coating 72 of each of the liquid packs 30 is carried on an optional release coating 74, such as a silicon coating, on a first surface 76 of the elongated liner 70 for selective release therefrom, as will be readily understood by one of ordinary skill in the art upon review of this disclosure. One suitable arrangement for providing the packs 30 on the liner 70 is disclosed in U.S. Pat. No. 7,824,752, entitled FAN-FOLDED WEB OF PRESSURE-SENSITIVE LABELS, assigned of record to the assignee of the present application, the entire disclosure of which is hereby incorporated by reference herein.

Turning now to FIG. 7, during formation of the liquid pack 30, the second adhesive 44 is preferably patterned on the top face 58 of the first laminate layer 36 to define the adhesive boundary 46. Additionally, patterning of the second adhesive 44 on the top face 58 of the first laminate layer 36 may also define the lift flap area 66. Also during formation of the liquid pack 30, the liquid 40 is preferably applied to the bottom face 64 of the second laminate layer 38 to be disposed within the liquid-holding pocket 50. It is believed that the selected viscosity of the liquid 40 described above allows the liquid 40 to be effectively pumped during formation yet remain in place on the bottom face 64 of the second laminate layer 38 until the liquid 40 is sealed within the liquid-holding pocket 50.

Preferably, although not necessarily, the bottom face 64 of the second laminate layer 38 is corona treated, as will be readily understood by one of ordinary skill in the art. Preferably, too, the top face 58 of the first laminate layer 36 is not corona treated. In this way, the second adhesive 44, which is patterned on the top face 58 of the first laminate layer 36 during formation of the liquid pack 30, will transfer to the bottom face 64 of the second laminate layer 38 upon subsequent separation of the first and second laminate layers 36, 38. Attention is particularly directed to FIG. 3, where the repositionable pressure-sensitive second adhesive 44 is depicted having been transferred to the bottom face 64 of the second laminate layer 38, with no adhesive residue remaining on the top face 58 of the first laminate layer 36.

Looking now to FIG. 8, a schematic view of a web press 100 suitable for forming the liquid packs 30 as part of a web label product 68 described above is depicted, and the forming process will be briefly described. In the following description of the press operation, the reference numbers for the materials described above with respect to the discrete liquid packs 30 will be maintained for brevity and convenience, as will be readily appreciated by one of ordinary skill in the art.

The web press 100 includes a first supply roll 102 comprising the base note layer 34 formed together with the common liner 70. A second supply roll 104 comprises the first laminate layer 36 formed together with the first adhesive coating 42. A third supply roll 106 comprises the second laminate layer 38 configured to receive the liquid 40. The web press 100 further includes a die cut matrix waste roll 108 and a final product roll 110.

The base note layer 34 formed together with the common liner 70 enters the press 100 from the first supply roll 102 and may be printed with multiple colors in one or both of a pair of print stations 112, 114. The first laminate layer 36 formed together with the first adhesive coating 42 enters the press 100 from the second supply roll 104. Both supply webs enter a first laminating station 116 and the base note layer 34 is married to the first lamination layer 36 with the first adhesive 42. This combined web enters an adhesive application station 118 and the second adhesive 44 is patterned on the top face 58 of the first laminate layer 36. The second adhesive 44 is heated in a drying station or heater 120.

The second laminate layer 38 enters the press 100 from the third supply roll 106, passing through a liquid application station 122, where the liquid 40 is patterned on the bottom face 64 of the second laminate layer 38. All three webs then enter a second laminating station 124 and are pressed together around the liquid 40, such that the base note layer 34, the first laminate layer 36, and the second laminate layer 38 are adhered together, with the liquid 40 sealed within the liquid-holding pocket 50.

The constructed web then moves to a die station 126 to cut the shape of the liquid packs 30 (depicted herein as rectangular). The waste matrix from around the finished liquid pack 30 is removed and wound around the die cut matrix waste roll 108 or is vacuumed away, as generally known in the art. The finished web label product 68 can then be rolled to the final product roll 110, sheeted into individual pieces, or fanfolded, as will be readily appreciated by one of ordinary skill in the art upon review of this disclosure.

With reference briefly now to FIGS. 9-13, a note-carried liquid pack 230 constructed in accordance with the principles of another preferred embodiment of the present invention is shown. As will be readily appreciated by one of ordinary skill in the art upon review of FIGS. 9-13, the liquid pack 230 is substantially the same as the liquid pack 30 described in detail above, with the exception of a different second lamination layer 238 (see, e.g., FIGS. 3-7). Therefore, for the sake of brevity, additional description of the duplicate elements and features will be avoided, and the reference numbers of any identical individual components will be numbered to correspond to the components described above (incremented by an order of two hundred), as will be readily appreciated by one of ordinary skill in the art.

Again, it is emphasized that the only difference between the liquid pack 30 depicted in FIGS. 1-7 and the liquid pack 230 depicted in FIGS. 9-13 is the configuration and size of the second lamination layer 238 (in all other material respects, the liquid pack 230 is identically constructed relative to the liquid pack 30). Therefore, any corresponding or similar components of the second lamination layer 238 relative to the second lamination layer 38 (e.g., the opposite top and bottom second laminate faces 262, 264 relative to the opposite top and bottom second laminate faces 62, 64) are similarly numbered herein (incremented by an order of two hundred), as described above. Any new or different components or features unique to the second lamination layer 238 are numbered starting at three hundred. As will be abundantly clear to one of ordinary skill in the art upon review of this disclosure, only this second lamination layer 238 will be described hereinbelow, with all other elements being described in detail above.

With attention still to FIGS. 9-13, the second laminate layer 238 will be described in further detail. The second laminate layer 238 presents opposite top and bottom second laminate faces 262, 264. Like the second laminate layer 38 described above, the second laminate layer 238 is fluid impermeable, at least substantially transparent, and overlies at least a portion of the top face 28 of the first laminate layer 236.

In the embodiment depicted in FIGS. 9-13, the second laminate layer 238 and the first laminate layer 236 are sized such that the second laminate layer 238 is laterally smaller than the first laminate layer 236. Preferably, although not necessarily, the second laminate layer 238 is presents a corresponding shape relative to the first laminate layer 236. Therefore, the top first laminate face 258 includes at least a portion 300 thereof that is uncovered by the second laminate layer 238. As will be readily understood by one of ordinary skill in the art, the uncovered portion 300 of the top first laminate face 258 is preferably devoid of the second adhesive 244.

The second laminate layer 238 is preferably at least substantially transparent. Even more preferably, the first laminate layer 36 as depicted herein is entirely clear. In other words, when viewing the printed indicia 256 on the top face 252 of the base note layer 234 through the overlying first and second laminate layers 236, 238, neither of the laminate layers 236, 238 distorts nor appreciably changes the color of the printed indicia 256 therebelow. More specifically, when at least some of the printed indicia 256 underlies the liquid-holding pocket 250, shown in the depicted embodiment described herein, the printed indicia 256 is clearly viewable to a user through both of the laminate layers 236, 238, including through portions thereof defining the liquid-holding pocket 250. The second laminate layer 238 is preferably, although not necessarily, formed of polyester, although one of ordinary skill in the art will readily appreciate that other suitable materials (e.g., other thin plastic sheets) are available.

With reference briefly now to FIG. 14, a note-carried liquid pack 430 constructed in accordance with the principles of another preferred embodiment of the present invention is shown with an article in the form of a magazine 432. As will be readily appreciated, FIG. 14 shows a removable portion of the liquid pack 430 being cleanly removed from the magazine 432. As will be readily appreciated by one of ordinary skill in the art upon review of FIGS. 14-18, the liquid pack 430 is substantially the same as the liquid pack 30 described in detail above, with the exception of the type of adhesive disposed on the bottom face 454 of the base note layer 434, and the inclusion of additional clear film layers below the base note layer 434 (see, e.g., FIGS. 2 and 4-7). Therefore, for the sake of brevity, additional description of the duplicate elements and features will be avoided, and the reference numbers of any identical individual components will be numbered to correspond to the components described above (incremented by an order of four hundred), as will be readily appreciated by one of ordinary skill in the art.

Again, it is emphasized that the only difference between the liquid pack 30 depicted in FIGS. 1-7 and the liquid pack 430 depicted in FIGS. 14-18 (and likewise, the web label product 68 depicted in FIGS. 4-7 and the web label product 468 depicted in FIGS. 15-18) is the adhesive and additional clear film layers below the base note layer 434 (in all other material respects, the liquid pack 430 is identically constructed relative to the liquid pack 30 from the base note layer 434 up). Therefore, any corresponding or similar components of the base note layer 434 relative to the base note layer 34 (e.g., the bottom face 454 of the base note layer 434 relative to the bottom face 54 of the base note layer 34) are similarly numbered herein (incremented by an order of four hundred), as described above. Any new or different components or features unique to the web label product 468 are numbered starting at five hundred. As will be abundantly clear to one of ordinary skill in the art upon review of this disclosure, only the adhesive and additional clear film layers below the base note layer 434 will be described hereinbelow, with all other elements being described in detail above.

Looking first to FIGS. 15-17, the note-carried liquid pack 430 further includes first and second layers 500, 502. As depicted and described herein, the first and second layers 500, 502 are clear film layers, although other suitable materials may be alternatively incorporated without departing from the spirit of the present invention. The first clear film layer 500 presents opposite top and bottom first film faces 504, 506. The second clear film layer 502 presents opposite top and bottom second film faces 508, 510. The first and second clear film layers 500, 502 are preferably fluid-impermeable. The top film face 504 of the first clear film layer 500 is operably secured to the bottom film face 510 of the second clear film layer 502 with a dry release adhesive coating 512 disposed between the clear film layers 500, 502.

In more detail, the base note layer 434 of each of the liquid packs 430 includes a pressure-sensitive adhesive coating 472, preferably a permanent adhesive coating, disposed on the bottom face 454 thereof. Additionally, the first clear film layer 500 includes a permanent pressure-sensitive adhesive coating 514 disposed on the bottom face 506 thereof. The second clear film layer 502 is operably secured to the bottom face 454 of the base note layer 434 with the permanent pressure-sensitive adhesive coating 472.

With attention back momentarily to FIG. 14, as will be readily appreciated by one of ordinary skill in the art, when the liquid pack 430 is removed from the magazine 432 (or other article; not shown), the first clear film layer 500 remains on the magazine 432 and the dry release adhesive coating 512 allows the second clear film layer 502 to be removed therefrom (while permanently attached to the bottom face 454 of the base note layer 434). Once the dry release adhesive coating 512 is separated, the second clear film layer 502 (and therefore the base note layer 434) is no longer tacky, allowing the liquid pack 430 to be transported or discarded without adhering to another surface.

With particular attention now to FIGS. 15-18, the web label product 468 is depicted including a plurality of note-carried liquid packs 430 described in detail above. More specifically, the web label product 468 comprises an elongated liner 470 and a plurality of the liquid packs 430. As described above, the first clear film layer 500 includes a permanent pressure-sensitive adhesive coating 514 disposed on the bottom face 506 thereof. The permanent pressure-sensitive adhesive coating 514 of each of the liquid packs 430 is carried on a release coating 574, such as a silicon coating, on a first surface 476 of the elongated liner 470 for selective release therefrom, as will be readily understood by one of ordinary skill in the art upon review of this disclosure.

Turning briefly now to FIG. 18, formation of the liquid pack 430 is accomplished substantially the same as formation of the liquid pack 30 described above, since the liquid pack 430 is identically constructed relative to the liquid pack 30 from the base note layer 434 up, as will be readily appreciated by one of ordinary skill in the art upon review of this disclosure.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and access the reasonably fair scope of the present invention as pertains to any apparatus not materially departing from but outside the literal scope of the invention set forth in the following claims.

What is claimed is:

1. A note-carried liquid pack configured to be applied to an article by a machine, said liquid pack comprising:
   a base note layer presenting opposite top and bottom note faces,
   said base note layer including printed indicia on the top note face;
   a first fluid-impermeable, substantially transparent laminate layer overlying at least a portion of the top face of the base note layer and presenting opposite top and bottom first laminate faces;
   a first adhesive disposed between the base note layer and the first laminate layer, operably securing the respective layers to one another;
   a second fluid-impermeable, substantially transparent laminate layer overlying at least a portion of the top face of the first laminate layer and presenting opposite top and bottom second laminate faces;
   a second adhesive disposed between the first laminate layer and the second laminate layer to adhere the laminate layers to one another along an endless adhesive boundary surrounding a central portion devoid of adhesive, in which the laminate layers define a liquid-holding pocket between the respective top and bottom faces thereof; and
   a substantially transparent liquid disposed within the liquid-holding pocket and being sealed therein so long as at least portions of the first and second laminate layers adjacent the pocket remain secured to one another by the second adhesive.

2. The note-carried liquid pack as claimed in claim 1,
   at least some of the printed indicia underlying the liquid-holding pocket,
   said printed indicia being viewable through the laminate layers and through the pocket.

3. The note-carried liquid pack as claimed in claim 2,
   said first and second laminate layers being clear.

4. The note-carried liquid pack as claimed in claim 3,
   said liquid and said pocket being clear and devoid of any opaque particulate therein.

5. The note-carried liquid pack as claimed in claim 2,
   said printed indicia including information about a retail product,
   said printed indicia and said liquid corresponding to one another.

6. The note-carried liquid pack as claimed in claim 1,
   said second adhesive being configured to permit separation of the laminate layers along at least a portion of the adhesive boundary to expose the liquid held within the pocket.

7. The note-carried liquid pack as claimed in claim 6,
   said second adhesive comprising a pressure-sensitive adhesive.

8. The note-carried liquid pack as claimed in claim 7,
said pressure-sensitive second adhesive comprising a repositionable adhesive, such that the laminate layers are operable to re-adhere to one another after separation thereof.

9. The note-carried liquid pack as claimed in claim 6,
said first and second laminate layers cooperatively defining therebetween a lift flap area between respective top and bottom faces thereof,
said lift flap area being defined by a second portion between the first and second laminate layers that is devoid of the second adhesive.

10. The note-carried liquid pack as claimed in claim 9,
said second laminate layer presenting a generally polygonal lateral shape,
said lift flap area being defined at least substantially adjacent a corner of the generally polygonal second laminate layer.

11. The note-carried liquid pack as claimed in claim 10,
said second adhesive being patterned on the top face of the first laminate layer to define the adhesive boundary and the lift flap area,
said liquid being applied to the bottom face of the second laminate layer to be disposed within the pocket.

12. The note-carried liquid pack as claimed in claim 6,
said liquid comprising a scented liquid.

13. The note-carried liquid pack as claimed in claim 12,
said liquid further comprising a viscosity-enhancing material, such that the liquid has a viscosity in the range of from about 800 centistokes to about 1200 centistokes.

14. The note-carried liquid pack as claimed in claim 1,
said first laminate layer substantially entirely overlying the printed indicia on the top face of the base note layer.

15. The note-carried liquid pack as claimed in claim 14,
said first laminate layer and said base note layer being co-extensive with one another, such that the first laminate layer completely overlies the base note layer.

16. The note-carried liquid pack as claimed in claim 15,
said second laminate layer and said first laminate layer being co-extensive with one another, such that the second laminate layer completely overlies the first laminate layer.

17. The note-carried liquid pack as claimed in claim 15,
said second laminate layer being laterally smaller than the first laminate layer, such that the top first laminate face includes at least a portion thereof that is uncovered by the second laminate layer,
said uncovered portion of the top first laminate face being devoid of the second adhesive.

18. The note-carried liquid pack as claimed in claim 1,
said second adhesive being patterned on the top face of the first laminate layer to define the adhesive boundary.

19. The note-carried liquid pack as claimed in claim 18,
said liquid being applied to the bottom face of the second laminate layer to be disposed within the pocket.

20. The note-carried liquid pack as claimed in claim 1,
said base note layer including a pressure-sensitive adhesive coating disposed on the bottom face thereof.

21. The note-carried liquid pack as claimed in claim 20,
said pressure-sensitive adhesive coating disposed on the bottom face of the base note comprising a repositionable adhesive.

22. A web label product comprising a plurality of note-carried liquid packs as claimed in claim 21,
said web label product further comprising an elongated liner,
said repositionable adhesive disposed on the bottom face of each of the plurality of note-carried liquid packs being carried on the first surface of the elongated liner for selective release therefrom.

23. The note-carried liquid pack as claimed in claim 1,
said base note layer including a permanent adhesive coating disposed on the bottom face thereof.

24. The note-carried liquid pack as claimed in claim 23,
said note-carried liquid pack further comprising:
first and second clear film layers each presenting opposite top and bottom film faces,
said first and second clear film layers being operably secured to one another with a dry release adhesive coating disposed between the respective top and bottom faces thereof,
said first clear film layer including a permanent pressure-sensitive adhesive coating disposed on the bottom face thereof,
said second clear film layer being operably secured to the bottom face of the base note layer.

25. A web label product comprising a plurality of note-carried liquid packs as claimed in claim 24,
said web label product further comprising an elongated liner including a release coating disposed on a first surface thereof,
said permanent pressure-sensitive adhesive coating disposed on the bottom face of the first clear film layer of each of the plurality of note-carried liquid packs being carried on the first surface of the elongated liner for selective release therefrom.

* * * * *